US006360331B2

(12) United States Patent
Vert et al.

(10) Patent No.: US 6,360,331 B2
(45) Date of Patent: *Mar. 19, 2002

(54) METHOD AND SYSTEM FOR TRANSPARENTLY FAILING OVER APPLICATION CONFIGURATION INFORMATION IN A SERVER CLUSTER

(75) Inventors: John D. Vert, Seattle; Sunita Shrivastava, Redmond, both of WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/061,857

(22) Filed: Apr. 17, 1998

(51) Int. Cl.$^7$ ................................................ H02H 3/05
(52) U.S. Cl. ........................ 714/4; 709/249; 709/239; 714/14; 714/57
(58) Field of Search ............................... 714/4, 14, 13, 714/10, 57; 709/223, 224, 200, 201, 249, 239

(56) References Cited

U.S. PATENT DOCUMENTS

| | | |
|---|---|---|
| 4,736,393 A | 4/1988 | Grimes et al. |
| 5,021,949 A | 6/1991 | Moten et al. |
| 5,027,269 A | 6/1991 | Grant et al. |
| 5,117,352 A | 5/1992 | Falek |
| 5,128,885 A | 7/1992 | Janis et al. |
| 5,165,018 A | 11/1992 | Simor |
| 5,301,337 A | 4/1994 | Wells et al. |
| 5,341,372 A | 8/1994 | Kirkham |

(List continued on next page.)

OTHER PUBLICATIONS

Chen et al., "Designing Mobile Computing Systems Using Distributed Objects," IEEE Communications Magazine, vol. 35, No. 2, pp. 62–70 (Feb. 1997), http: iel.his.com: 80 cgi–bin?iel_egi?se . . . 2ehts printed May 21, 1999.

Chowdhury, et al., "Supporting Dynamic Space–Sharing on Clusters of Non–dedicated Workstations," International Conference on Distributed Computing Systems, pp. 149–158 (1997).

Islam et al., "Extensible Resource Management for Cluster Computing," Distributed computing Systems, 1997, Proceedings of the 17$^{th}$ International Conference, pp. 561–568 (May 1997).

Carr, Richard, "The Tandem Global Update Protocol," *Tandem Systems Review*, vol. 1, No. 2, 74–85 (1985).

Lamport, Leslie, *A Fast Mutual Exclusion Algorithm*, Digital Equipment Corporation, Oct. 31, 1986.

Lamport, Leslie, *The Part–Time parliament*, Digital Equipment Corporation, Sep. 1, 1989.

*Primary Examiner*—Ayaz Sheikh
*Assistant Examiner*—Firmin Backer
(74) *Attorney, Agent, or Firm*—Michalik & Wylie, PLLC

(57) ABSTRACT

A method and system for transparently failing over a legacy application from a first system to a second system of a server cluster by tracking and checkpointing changes to application configuration information stored in a system's local registry. When an application running on the first system makes a change to the application configuration information in a subtree of the registry, the change is detected and a snapshot of the subtree's data is taken. The snapshot is written to a storage device shared by systems of the cluster, such as a quorum disk. When the application is failed over to a second system, the snapshot for that application is retrieved from the quorum disk and written to the registry of the second system in a corresponding subtree. The application is then run on the second system using the most-recent application configuration information as modified by the other system in the cluster.

32 Claims, 11 Drawing Sheets

U.S. PATENT DOCUMENTS

| | | | |
|---|---|---|---|
| 5,398,329 A | 3/1995 | Hirata et al. | |
| 5,416,777 A | 5/1995 | Kirkham | |
| 5,423,037 A | 6/1995 | Hvasshovd | |
| 5,434,865 A | 7/1995 | Kirkham | |
| 5,435,003 A | 7/1995 | Chng et al. | |
| 5,490,270 A | 2/1996 | Devarakonda et al. | |
| 5,491,800 A | 2/1996 | Goldsmith et al. | |
| 5,537,532 A | 7/1996 | Chng et al. | |
| 5,568,491 A | 10/1996 | Beal et al. | |
| 5,666,486 A * | 9/1997 | Alfieri et al. | 709/217 |
| 5,666,538 A * | 9/1997 | DeNicola | 713/320 |
| 5,710,727 A | 1/1998 | Mitchell et al. | |
| 5,715,389 A | 2/1998 | Komori et al. | |
| 5,737,601 A | 4/1998 | Jain et al. | |
| 5,745,669 A * | 4/1998 | Hugard et al. | 714/3 |
| 5,754,752 A | 5/1998 | Sheh et al. | |
| 5,754,877 A | 5/1998 | Hagersten et al. | |
| 5,757,642 A | 5/1998 | Jones | |
| 5,768,523 A | 6/1998 | Schmidt | |
| 5,768,524 A | 6/1998 | Schmidt | |
| 5,781,737 A | 7/1998 | Schmidt | |
| 5,787,247 A | 7/1998 | Norin et al. | |
| 5,794,253 A | 8/1998 | Norin et al. | |
| 5,805,839 A | 9/1998 | Singhal | |
| 5,806,075 A | 9/1998 | Jain et al. | |
| 5,812,779 A * | 9/1998 | Ciscon et al. | 395/200.53 |
| 5,815,649 A | 9/1998 | Utter et al. | |
| 5,819,019 A | 10/1998 | Nelson | |
| 5,822,532 A | 10/1998 | Ikeda | |
| 5,832,514 A | 11/1998 | Norin et al. | |
| 5,852,724 A * | 12/1998 | Glenn, II et al. | 709/239 |
| 5,857,073 A * | 1/1999 | Tsukamoto et al. | 395/200.38 |
| 5,867,714 A * | 2/1999 | Todd et al. | |
| 5,919,247 A * | 7/1999 | Van Hoff et al. | 709/217 |
| 5,933,422 A | 8/1999 | Kusano et al. | |
| 5,935,230 A * | 8/1999 | Pinai et al. | 710/111 |
| 5,940,870 A | 8/1999 | Chi et al. | |
| 5,946,689 A * | 8/1999 | Yanaka et al. | 707/10 |
| 5,963,960 A | 10/1999 | Swart et al. | |
| 5,968,121 A * | 10/1999 | Logan et al. | 709/219 |
| 5,968,140 A * | 10/1999 | Hall | 710/14 |
| 5,982,747 A | 11/1999 | Ramfelt et al. | |
| 5,991,771 A | 11/1999 | Falls et al. | |
| 5,991,893 A | 11/1999 | Snider | |
| 6,003,075 A | 12/1999 | Arendt et al. | |
| 6,044,367 A * | 3/2000 | Wolff | 707/1 |
| 6,047,323 A * | 4/2000 | Krause | 709/227 |
| 6,134,673 A * | 10/2000 | Chrabaszcz | 714/13 |
| 6,173,420 B1 * | 1/2001 | Sunkara et al. | 714/38 |
| 6,195,760 B1 * | 2/2001 | Chung et al. | 714/4 |

* cited by examiner

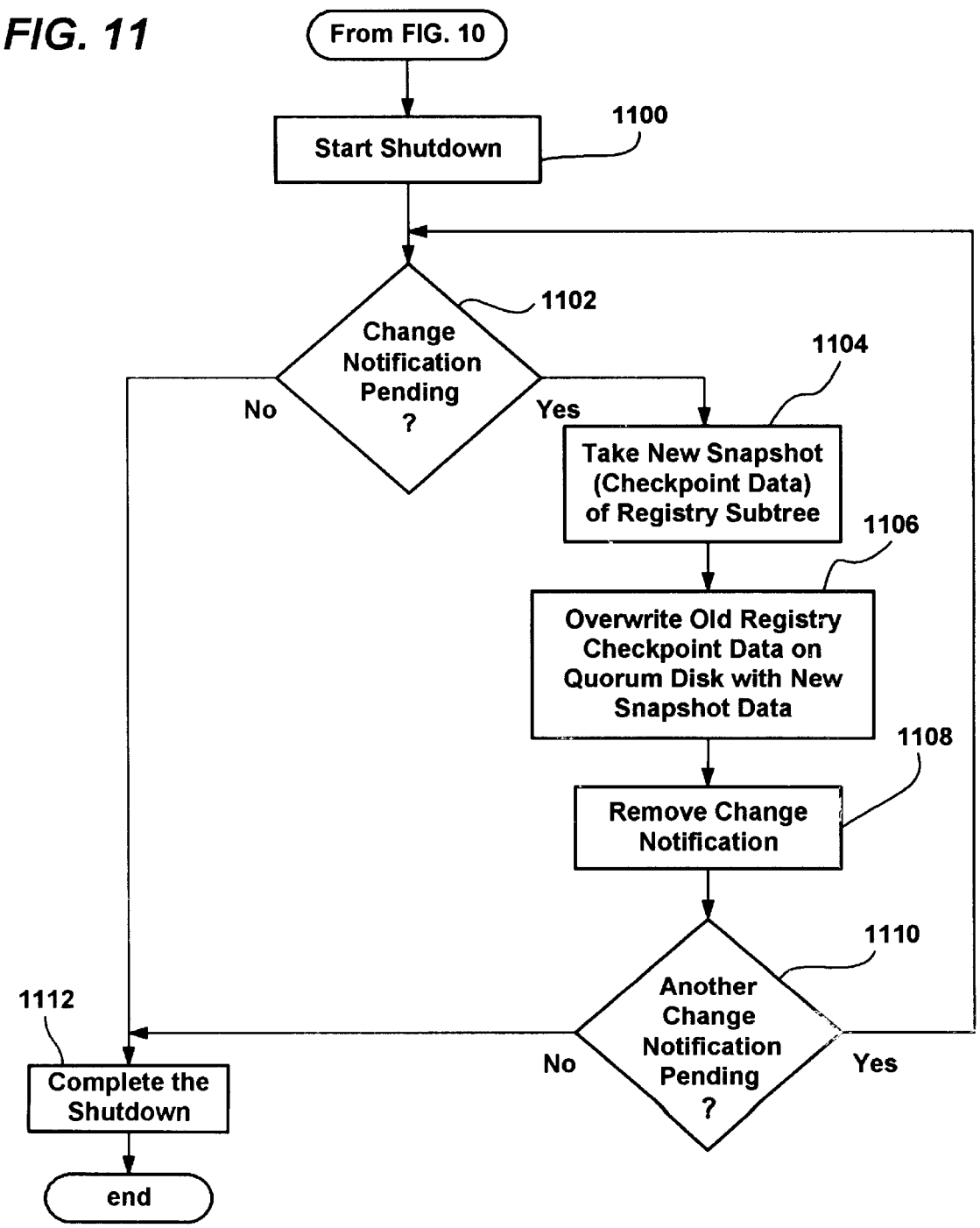

US 6,360,331 B2

METHOD AND SYSTEM FOR TRANSPARENTLY FAILING OVER APPLICATION CONFIGURATION INFORMATION IN A SERVER CLUSTER

FIELD OF THE INVENTION

The invention relates generally to computer network servers, and more particularly to computer servers arranged in a server cluster.

BACKGROUND OF THE INVENTION

A server cluster is a group of at least two independent servers connected by a network and managed as a single system. The clustering of servers provides a number of benefits over independent servers. One important benefit is that cluster software, which is run on each of the servers in a cluster, automatically detects application failures or the failure of another server in the cluster. Upon detection of such failures, failed applications and the like can be terminated and restarted on a surviving server.

Other benefits include the ability for administrators to inspect the status of cluster resources, and accordingly balance workloads among different servers in the cluster to improve performance. Dynamic load balancing is also available. Such manageability also provides administrators with the ability to update one server in a cluster without taking important data and applications offline. As can be appreciated, server clusters are used in critical database management, file and intranet data sharing, messaging, general business applications and the like.

Thus, the failover of an application from one server (i.e., machine) to another may be automatic in response to a software or hardware failure on the first machine, or alternatively may be manually initiated by an administrator. In any event, to failover an application in a manner that is transparent to the application and to the client requires that the application's execution environment be recreated on the other machine. This execution environment comprises distinct parts having different characteristics from one another, a first part of which is the application code. The application code changes very rarely, and thus an application's code environment may be replicated either by installing the application on all of the machines which may run in a cluster, or by installing the application on storage that is shared by all machines in the cluster. When an application needs to be restarted, the exact code is thus available to the cluster.

Another part of the execution environment is the application's data, which changes very regularly. The application's data environment is best preserved by having the application store all of its data files on a shared disk, a task that is ordinarily accomplished by inputting appropriate information via the application's user interface. When an application needs to be restarted, the exact data is thus available to the cluster.

A third part of the execution environment is the application configuration information, which changes occasionally. Applications that are "cluster-aware" (i.e., designed with the knowledge that they may be run in a clustering environment) store their application configuration information in a cluster registry maintained on a shared disk, thus ensuring reliable failover.

However, existing applications that are not cluster-aware (i.e., legacy applications) use their local machine registry to store their application configuration information. For example, Windows NT applications use the WIN32 Registry. As a result, this configuration data is not available to the rest of the cluster. At the same time, it is impractical (and likely very dangerous) to attempt to modify these legacy applications so as to use the cluster registry instead of their local registry. Moreover, it is not feasible to transparently redirect each of the local registries in the various machines to the cluster registry, and costly to replicate copies of each of the local registries to the various machines. Nevertheless, in order to ensure correct and transparent behavior after a failover, the application configuration information needs to be recreated at the machine on which the application is being restarted.

SUMMARY OF THE INVENTION

The present invention provides a method and system for transparently failing over resource configuration information stored by a resource (such as an application) on a local machine. More particularly, the application configuration information written to a registry of a local machine is made available to other machines of the cluster. The other machines can rapidly obtain this application configuration information and use it to recreate the application's execution environment on another machine in the cluster, ensuring a rapid and transparent failover operation.

Briefly, the present invention transparently fails over a legacy application by tracking and checkpointing changes to application configuration information that is stored locally, such as in a system's local registry. When an application running on the first system makes a change to the application configuration information in a subtree of the registry, the change is detected by a notification mechanism. A snapshot mechanism is notified, takes a snapshot of the subtree's data, and causes it to be written to a storage device shared by systems of the cluster. When the application is failed over to a second system, the snapshot for that application is retrieved from the quorum disk by a restore mechanism and written to the registry of the second system in a corresponding subtree. The application is then run on the second system using the restored application configuration information for that application.

Other benefits and advantages will become apparent from the following detailed description when taken in conjunction with the drawings, in which:

BRIEF DESCRIPTION OF THE DRAWINGS

FIGS. 7–11 comprise a flow diagram generally representing the steps taken to failover application configuration information in accordance with one aspect of the present invention.

DETAILED DESCRIPTION OF THE PREFERRED EMBODIMENT

Exemplary Operating Environment

Figure 1:
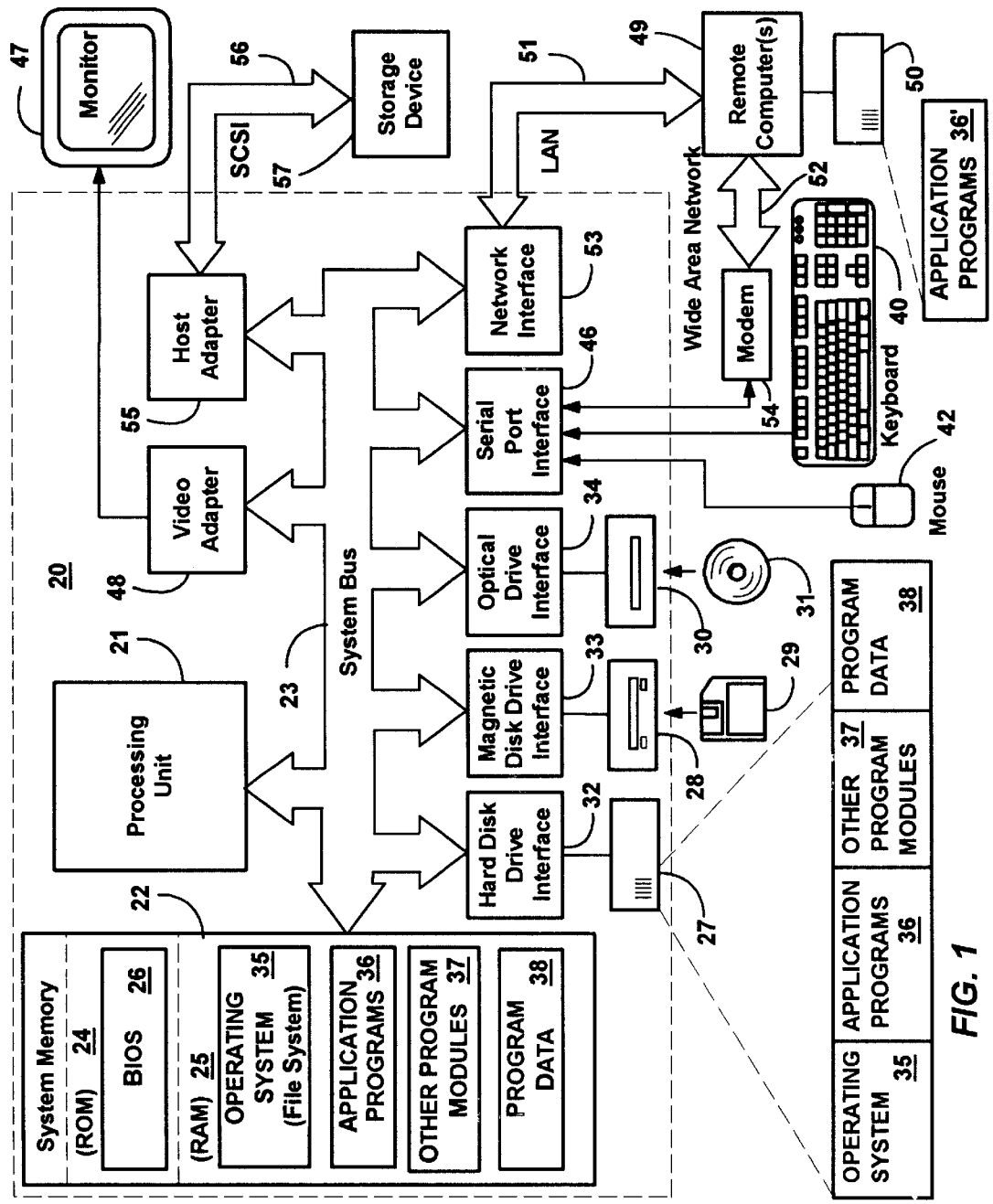
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like acting as a node (i.e., system) in a clustering environment. The computer 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (which may be considered as including or operatively connected to a file system), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 operates in a networked environment using logical connections to one or more remote computers 49. At least one such remote computer 49 is another system of a cluster communicating with the personal computer system 20 over the networked connection. Other remote computers 49 may be another personal computer such as a client computer, a server, a router, a network PC, a peer device or other common network system, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet. Other mechanisms suitable for connecting computers to form a cluster include direct connections such as over a serial or parallel cable, as well as wireless connections. When used in a LAN networking environment, as is typical for connecting systems of a cluster, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
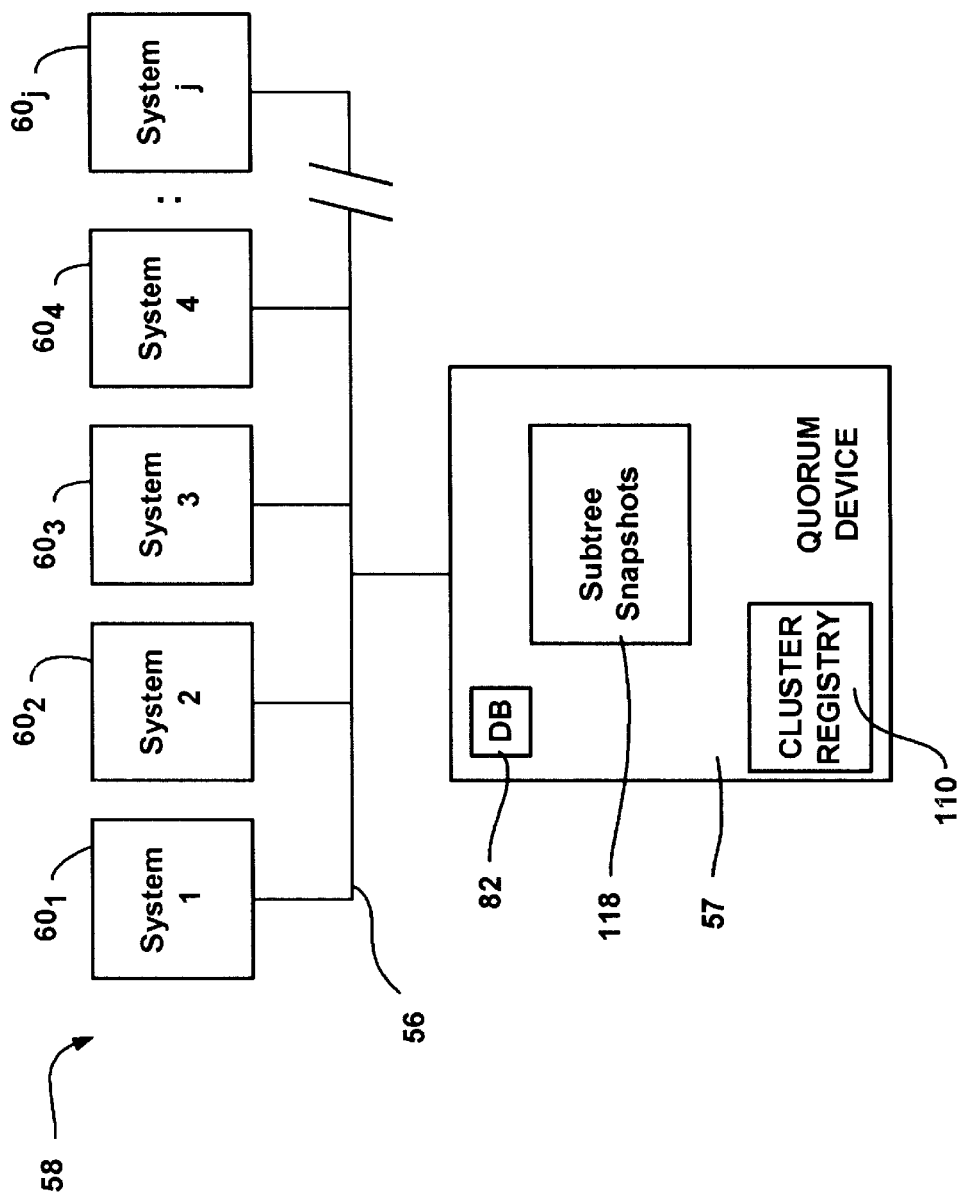
FIG. 2 is a block diagram representing a server cluster including various cluster machines and a shared quorum device for storing cluster information.

The preferred system 20 further includes a host adapter 55 or the like which connects the system bus 23 to a SCSI (Small Computer Standard Interface) bus 56 for communicating with at least one persistent memory storage device 57, also referred to herein as a quorum device. Of course, other ways of connecting cluster systems to a storage device, including Fiber Channel, are equivalent. In any event, as shown in FIG. 2, the computer system 20 may comprise the system $60_1$, while one of the remote computers 49 may be similarly connected to the SCSI bus 56 and comprise the system $60_2$, and so on. Note that multiple shared storage devices may be connected to the SCSI bus 56 (or the like) such as for purposes of resilience to disk failure through the use of multiple disks, i.e., software and/or hardware-based redundant arrays of inexpensive or independent disks (RAID).

To create a new cluster, a system administrator runs a cluster installation utility on a system that then becomes a first member of the cluster 58. For a new cluster 58, a database is created and the initial cluster member information is added thereto. The administrator then configures any devices that are to be managed by the cluster software. At this time, a cluster exists having a single member, after which the installation procedure is run on each of the other members of the cluster. For each added member, the name of the existing cluster is entered and the new system receives a copy of the existing cluster database.

Figure 3:
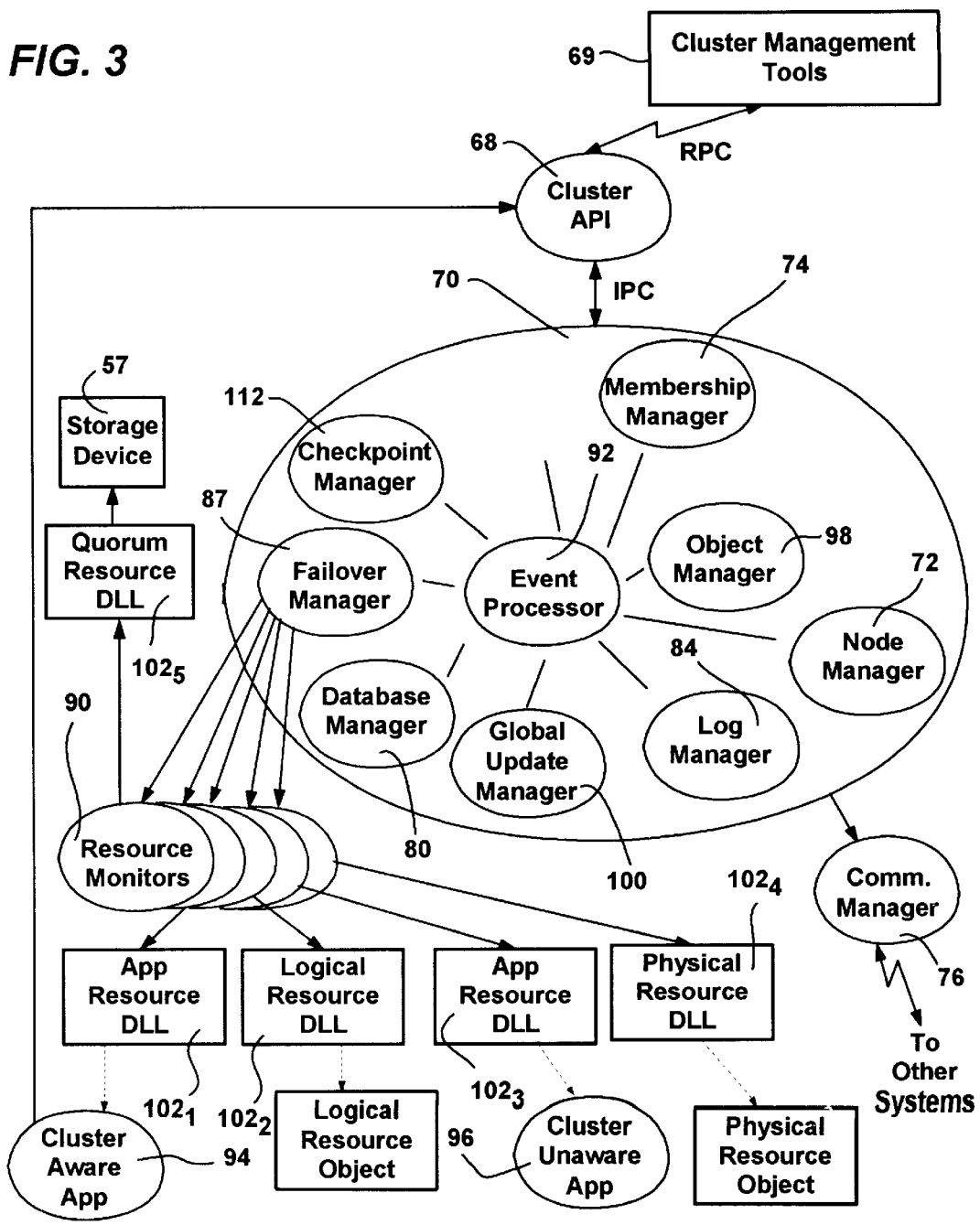
FIG. 3 is a representation of various components within the clustering service of a machine.

As shown in FIG. 3, to accomplish cluster creation and to perform other administration of cluster resources, systems, and the cluster itself, a cluster application programming interface (API) 68 is provided. Applications and cluster management administration tools 69 call various interfaces in the API 68 using remote procedure calls (RPC), whether running in the cluster or on an external system. The various interfaces of the API 68 may be considered as being categorized by their association with a particular cluster component, i.e., systems, resources and the cluster itself.

Cluster Service Components

FIG. 3 provides a representation of the cluster service components and their general relationships in a single system (e.g., $60_1$) of a Windows NT cluster. A cluster service 70 controls the cluster operation on a cluster system 58, and is preferably implemented as a Windows NT service. The cluster service 70 includes a node manager 72, which manages node configuration information and network configuration information (e.g., the paths between nodes). The node manager 72 operates in conjunction with a membership manager 74, which runs the protocols that determine what cluster membership is when a change (e.g., regroup) occurs. A communications manager 76 (kernel driver) manages communications with other systems of the cluster 58 via one or more network paths. The communications manager 76 sends periodic messages, called heartbeats, to counterpart components on the other systems of the cluster 58 to provide a mechanism for detecting that the communications path is good and that the other systems are operational. Through the communications manager 76, the cluster service 70 is essentially in constant communication with the other systems of the cluster. In a small cluster, communication is fully connected, i.e., all systems of the cluster 58 are in direct communication with all other systems.

Systems (e.g., $60_1$–$60_j$ of FIG. 2) in the cluster 58 have the same view of cluster membership, and in the event that one system detects a communication failure with another system, the detecting system broadcasts a message to the cluster 58 causing other members to verify their view of the current cluster membership. This is known as a regroup event, during which writes to potentially shared devices are disabled until the membership has stabilized. If a system does not respond, it is removed from the cluster 58 and its active groups are failed over ("pulled") to one or more active systems. Note that the failure of a cluster service 70 also causes its locally managed resources to fail.

The cluster service 70 also includes a configuration database manager 80 which implements the functions that maintain a cluster configuration database on a local device such as a disk and/or memory, and a configuration database 82 (FIG. 2) on the common persistent storage devices, (e.g., storage device 57). The database maintains information about the physical and logical entities in the cluster 58, including the cluster itself, systems, resource types, quorum resource configuration, network configuration, groups, and resources. Note that both persistent and volatile information may be used to track the current and desired state of the cluster. The database manager 80 cooperates with counterpart database managers of systems in the cluster 58 to maintain configuration information consistently across the cluster 58. As described below, global updates are used to ensure the consistency of the cluster database in each of systems. The configuration database manager 80 also provides an interface to the configuration database 82 for use by the other cluster service 70 components.

A logging manager 84 provides a facility that works with the database manager 80 to maintain cluster state information across a situation in which a cluster shuts down and a new cluster is later formed with no members common to the previous cluster, known as a temporal partition. The logging manager 84 operates with a log file, preferably maintained on the quorum device (storage device 57), to unroll logged state changes when forming a new cluster following a temporal partition.

A failover manager 87 makes resource/group management decisions and initiates appropriate actions, such as startup, restart and failover. The failover manager 87 is responsible for stopping and starting the system's resources, managing resource dependencies, and for initiating failover of groups. A group is a collection of resources organized to allow an administrator to combine resources into larger logical units and manage them as a unit. Usually a group contains all of the elements needed to run a specific application, and for client systems to connect to the service provided by the application. For example, a group may include an application that depends on a network name, which in turn depends on an Internet Protocol (IP) address, all of which are collected in a single group. In a preferred arrangement, the dependencies of all resources in the group are maintained in a directed acyclic graph, known as a dependency tree. Group operations performed on a group affect all resources contained within that group. Dependency trees are described in more detail in U.S. patent application Ser. No. 08/963,049 entitled "Method and System for Resource Monitoring of Disparate Resources in a Server Cluster," assigned to the same assignee as the present invention.

The failover manager 87 receives resource and system state information from at least one resource monitor 90 and the node manager 72, for example, to make decisions about groups. The failover manager 87 is responsible for deciding which systems in the cluster should "own" which groups. Those systems that own individual groups turn control of the resources within the group over to their respective failover managers 87.

An event processor 92 connects the components of the cluster service 70 via an event notification mechanism. The event processor 92 propagates events to and from applications (e.g., 94 and 96) and to and from the components within the cluster service 70, and also performs miscellaneous services such as delivering signal events to cluster-aware applications 94. The event processor 92, in conjunction with an object manager 98, also maintains various cluster objects. A global update manager 100 operates to provide a global update service that is used by other components within the Cluster Service 70.

The global update protocol (GLUP) is used by the global update manager 100 to broadcast updates to each node in a cluster. GLUP generally comprises a standard global update message format, state information maintained in each node, and a set of rules that specify how global update should be processed and what steps should be taken when failures occur. In general, according to the GLUP protocol, one node (e.g. $60_1$) serves as a "locker" node. The locker node $60_1$ ensures that only one global update is in progress at any given time. With GLUP, a node (e.g., $60_2$) wishing to send an update to other nodes first sends a request to the locker node $60_1$. When any preceding updates are complete, the locker node $60_1$ gives permission for this "sender" node $60_2$ to broadcast its update to the other nodes in the system. In accordance with GLUP, the sender node sends the updates, one at a time, to the other nodes in a predetermined GLUP order that is ordinarily based on a unique number assigned to each node. GLUP can be utilized to replicate data to the machines of a cluster, including application configuration information, as described below. A more detailed discussion of the GLUP protocol is described in the publication "Tandem Systems Review" Volume 1, Number 2, June, 1985 pp. 74–84.

A resource monitor 90 runs in one or more processes that may be part of the cluster service 70, but are shown herein as being separate from the cluster service 70 and communicating therewith via Remote Procedure Calls (RPC) or the like. The resource monitor 90 monitors the health of one or more resources (e.g., $102_1$–$102_5$) via callbacks thereto. The monitoring and general operation of resources is described in more detail in U.S. patent application Ser. No. 08/963,049, hereby incorporated by reference herein in its entirety.

The resources (e.g., $102_1$–$102_5$) are implemented as one or more Dynamically Linked Libraries (DLLS) loaded into the address space of the Resource Monitor 102. For example, resource DLLs may include physical disk, logical volume (consisting of one or more physical disks), file and print shares, network addresses and names, generic service or application, and Internet Server service DLLs. Certain resources (e.g., provided by a single source) may be run in a single process, while other resources may be run in at least one other process. The resources $102_1$–$102_5$ run in the system account and are considered privileged code. Resources $102_1$–$102_5$ may be defined to run in separate processes, created by the Cluster Service 70 when creating resources.

Resources expose interfaces and properties to the cluster service 70, and may depend on other resources, with no circular dependencies allowed. If a resource does depend on other resources, the resource is brought online after the resources on which it depends are already online, and is taken offline before those resources. Moreover, each resource has an associated list of systems in the cluster on which this resource may execute. For example, a disk resource may only be hosted on systems that are physically connected to the disk. Also associated with each resource is a local restart policy, defining the desired action in the event that the resource cannot continue on the current system.

Systems in the cluster need to maintain a consistent view of time. One of the systems, known as the time source and selected by the administrator, includes a resource that implements the time service. Note that the time service, which maintains consistent time within the cluster 58, is implemented as a resource rather than as part of the cluster service 70 itself.

From the point of view of other systems in the cluster 58 and management interfaces, systems in the cluster 58 may be in one of three distinct states, offline, online or paused. These states are visible to other systems in the cluster 58, and thus may be considered the state of the cluster service 70. When offline, a system is not a fully active member of the cluster 58. The system and its cluster service 70 may or may not be running. When online, a system is a fully active member of the cluster 58, and honors cluster database updates, can contribute one or more votes to a quorum algorithm, maintains heartbeats, and can own and run groups. Lastly, a paused system is a fully active member of the cluster 58, and thus honors cluster database update, can contribute votes to a quorum algorithm, and maintain heartbeats. Online and paused are treated as equivalent states by most of the cluster software, however, a system that is in the paused state cannot honor requests to take ownership of groups. The paused state is provided to allow certain maintenance to be performed.

Note that after initialization is complete, the external state of the system is offline. The event processor calls the node manager 72 to begin the process of joining or forming a cluster. To join a cluster, following the restart of a system, the cluster service 70 is started automatically. The system configures and mounts local, non-shared devices. Cluster-wide devices are left offline while booting, because they may be in use by another node. The system tries to communicate over the network with the last known members of the cluster 58. When the system discovers any member of the cluster, it performs an authentication sequence wherein the existing cluster system authenticates the newcomer and returns a status of success if authenticated, or fails the request if not. For example, if a system is not recognized as a member or its credentials are invalid, then the request to join the cluster is refused. If successful, the newcomer is sent an updated copy of the shared database. The joining system uses this shared database to find shared resources and to bring them online as needed, and also to find other cluster members.

If a cluster is not found during the discovery process, a system will attempt to form its own cluster. In general, to form a cluster, the system gains exclusive access to a special resource known as the quorum resource (quorum device or disk) 57. The quorum resource 57 is used as a tie-breaker when booting a cluster and also to protect against more than one node forming its own cluster if communication fails in a multiple node cluster. The quorum resource is often (but not necessarily) a disk that maintains the state of the cluster, which a node arbitrates for and needs possession of before it can form a cluster. The quorum resource 57 preferably maintains a log file that is unrolled to ensure consistency across a temporal partition when forming a new cluster, after another cluster previously existed. The node 57 that has possession of the quorum resource is responsible for logging operations, and thus if application configuration information is replicated, such an operation is logged. Also, the quorum resource 57 offers a method for arbitrating a quorum resource object, typically by challenging (or defending) for an exclusive reservation of a storage device (e.g., 57 of FIG. 2A) such as a disk that ordinarily stores log data for the cluster. A method for releasing an exclusive reservation may also be provided. The general operation of quorum resources including arbitration and exclusive possession of the quorum resource is described in more detail in U.S. patent application Ser. No. 08/963,050 entitled "Method and System for Quorum Resource Arbitration in a Server Cluster," assigned to the same assignee and hereby incorporated by reference herein in its entirety.

When leaving a cluster, a cluster member will send a ClusterExit message to all other members in the cluster, notifying them of its intent to leave the cluster. The exiting cluster member does not wait for any responses and immediately proceeds to shutdown all resources and close all connections managed by the cluster software. Sending a message to the other systems in the cluster when leaving saves the other systems from discovering the absence by a time-out operation.

Once online, a system can have groups thereon. A group can be "owned" by only one system at a time, and the individual resources within a group are present on the system which currently owns the Group. As a result, at any given instant, different resources within the same group cannot be owned by different systems across the cluster.

Groups can be failed over or moved from one system to another as atomic units. Each group has a cluster-wide policy associated therewith comprising an ordered list of owners. A group fails over to systems in the listed order.

For example, if a resource (e.g., an application) fails, the failover manager 87 may choose to restart the resource, or to take the resource offline along with any resources dependent thereon. If the failover manager 87 takes the resource offline, the group is restarted on another system in the cluster, known as pushing the group to another system. A cluster administrator may also manually initiate such a group transfer. Both situations are similar, except that resources are gracefully shutdown for a manually initiated failover, while they are forcefully shut down in the failure case.

When an entire system in the cluster fails, its groups are pulled from the failed system to another system. This process is similar to pushing a group, but without the shutdown phase on the failed system. To determine what groups were running on the failed system, the systems maintain group information on each node of the cluster in a database to track which systems own which groups. To determine which system should take ownership of which groups, those systems capable of hosting the groups negotiate among themselves for ownership, based on system capabilities, current load, application feedback and/or the group's system preference list. Once negotiation of a group is complete, all members of the cluster update their databases to properly reflect which systems own which groups.

When a previously failed system comes back online, the failover manager 87 decides whether to move some groups back to that system, in an action referred to as failback. To automatically failback, groups require a defined preferred owner. Groups for which the newly online system is the preferred owner are pushed from the current owner to the new system. Protection, in the form of a timing window, is included to control when the failback occurs.

Failing Over Application Configuration Information

Although the present invention primarily provides benefits with legacy applications, as will become apparent below, other types of resources may be failed over to other systems of a cluster. Accordingly, the present invention will be described with respect to the failing over of application configuration information stored in a local registry, however it is understood that it will operate in an equivalent manner with other types of resources that may store their configuration information locally rather than with the cluster. Thus, as used herein, the term "application" and "resource" are equivalent when used with respect to the failing over of appropriate configuration information.

In accordance with one aspect of the present invention, there is provided a method and system for tracking and checkpointing changes to a local system's registry, such that application configuration changes that would otherwise be lost are protected from machine failures. As will be described below, because the registry checkpointing is transparent to the application, no application changes are required, whereby a legacy application which stores its configuration in the local registry may be reliably used in a failover environment.

Figure 4:
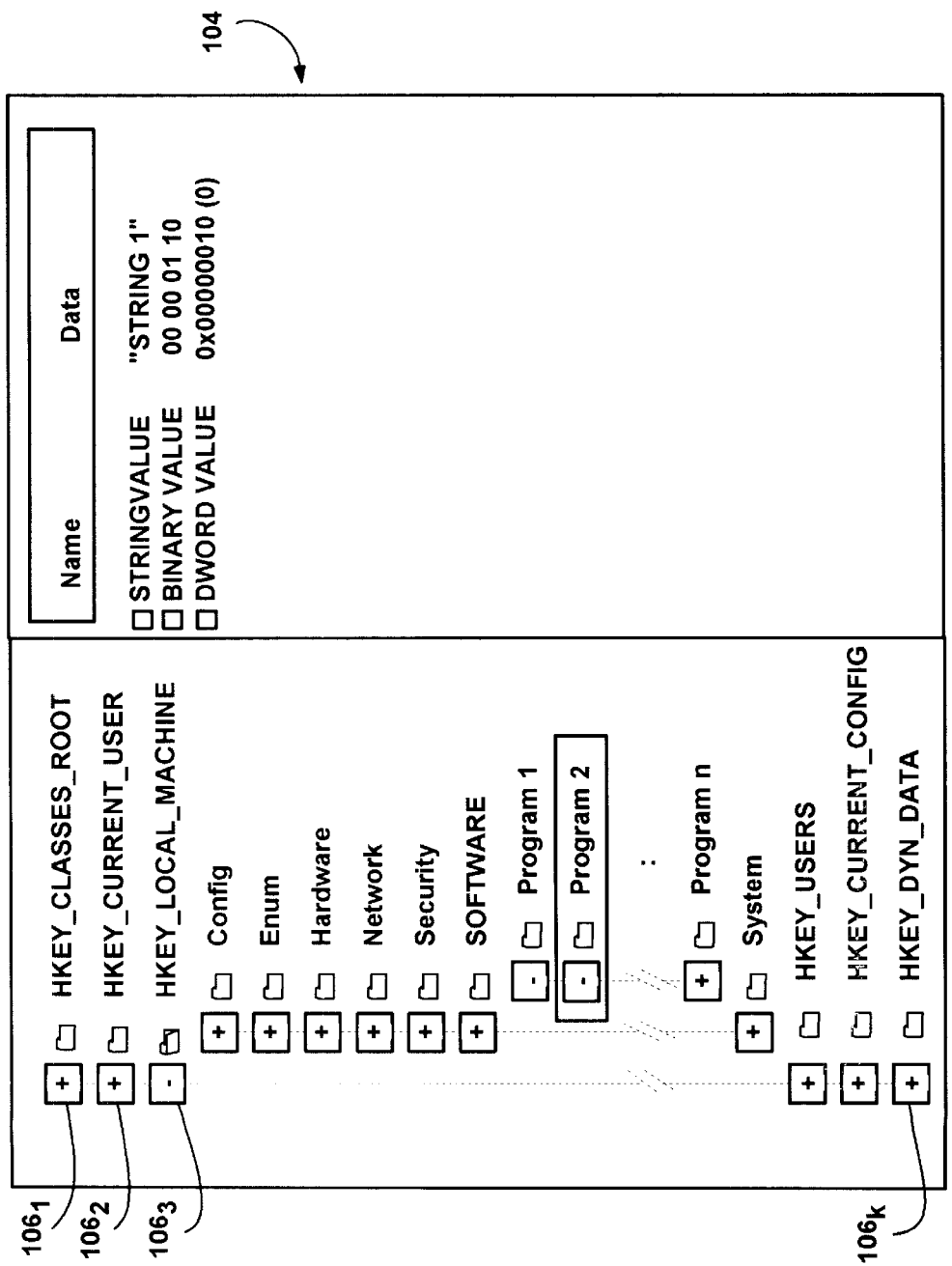
FIG. 4 is a representation of a local registry maintained on a local machine.

As represented in FIG. 4, a local system's registry 104 is essentially a database indexed by a number of keys $106_1$–$106_k$ hierarchically arranged into trees and subtrees. As shown in FIG. 4, the keys (particularly the low level subtrees) typically have named data associated therewith including strings, binary values and/or DWORDs. As described above, legacy applications store configuration information in the local registry 104, and occasionally make changes thereto. For example, as shown in FIG. 4, an application named "Program2" has configuration information indexed at HKEY_LOCAL_MACHINE/ SOFTWARE/Program2, including a string, a binary value and a DWORD.

Figure 5:
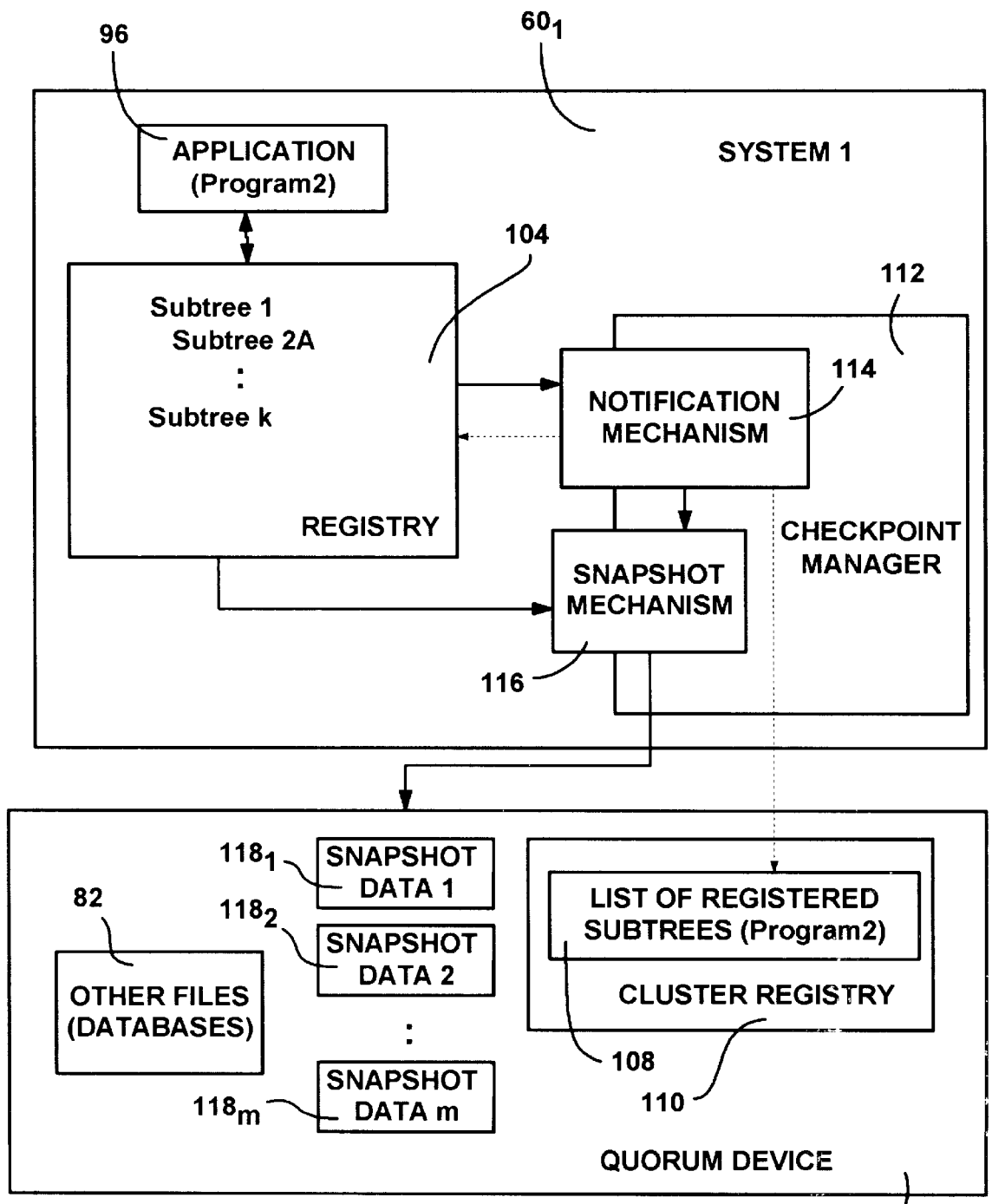
FIG. 5 is a block diagram generally representing the components for writing local registry information to the quorum device from a local machine in accordance with one aspect of the present invention.
Figure 6:
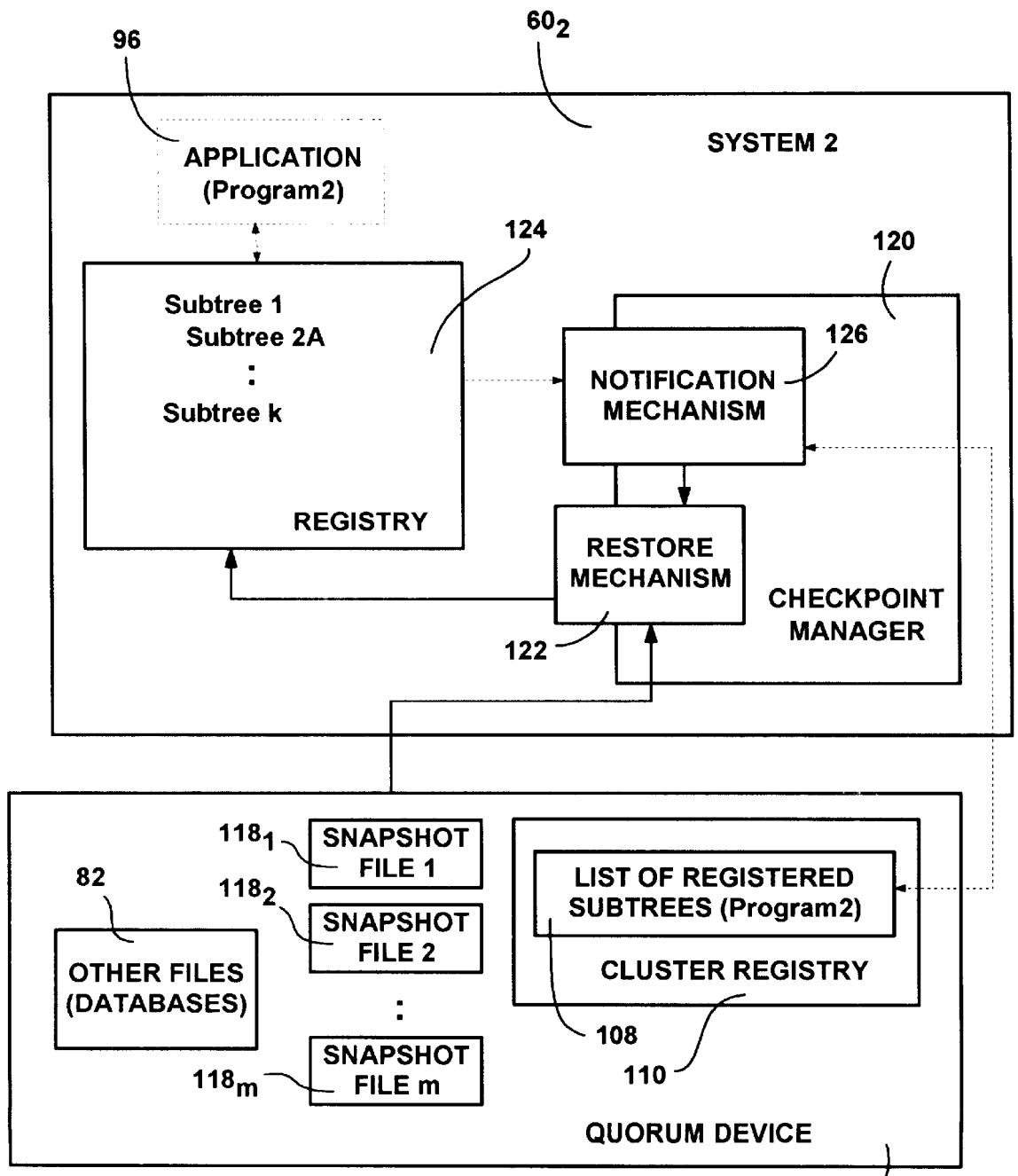
FIG. 6 is a block diagram generally representing the components for restoring registry information from the quorum device to a registry of a local machine in accordance with one aspect of the present invention.
Figure 7:
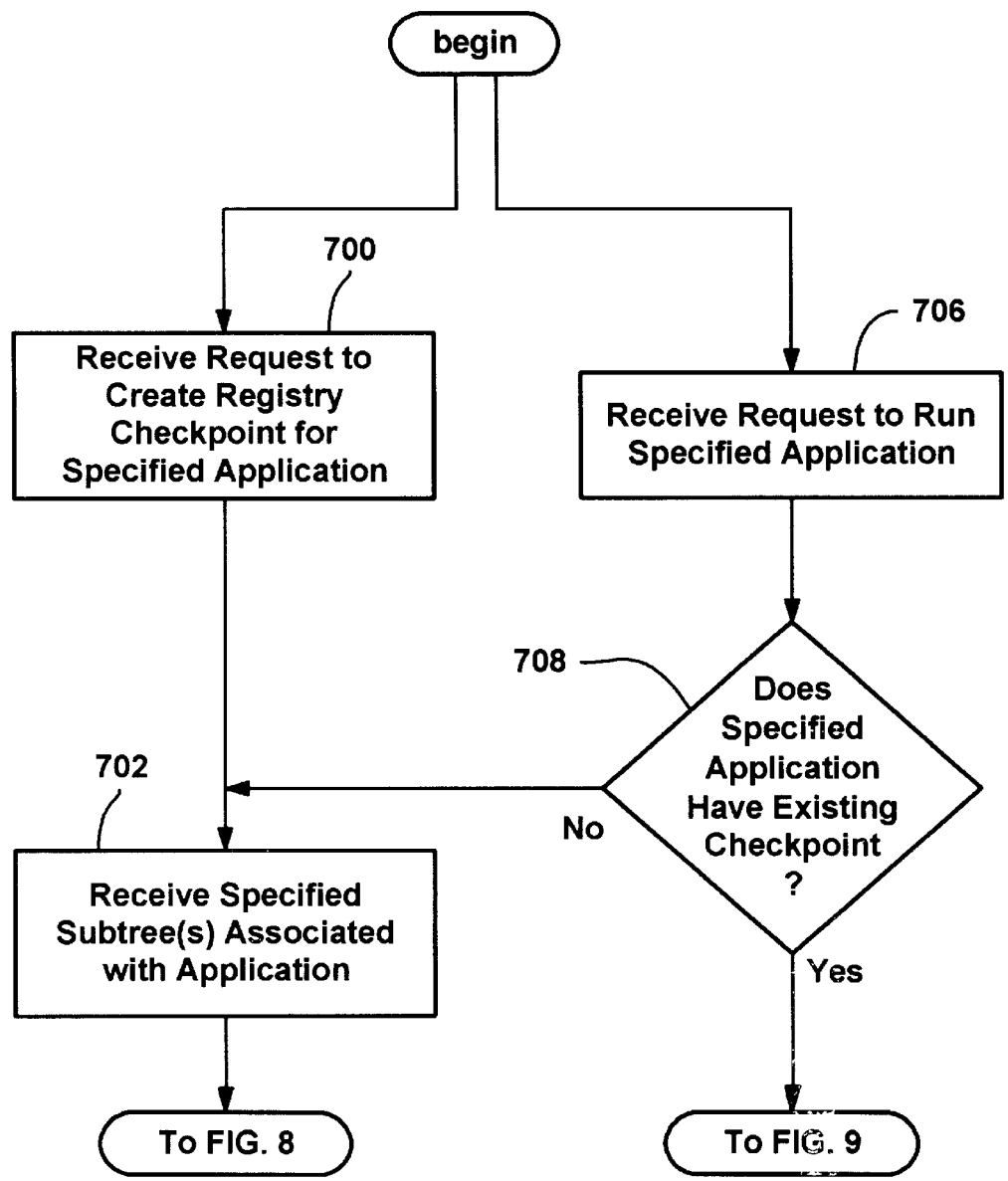

FIG. 5 represents the general architecture for tracking and checkpointing changes to configuration information on a first system (e.g., $60_1$), while FIG. 6 represents the general architecture for failing over the information to another system (e.g., $60_2$) of the cluster 58. In general, whenever an application 96 is initially installed on any cluster machine, a list 108 of registry subtrees associated with that application 96 may be generated. As can be appreciated, this may be accomplished by noting the differences to the local registry key structure after the application 96 is installed. This list 108 is preferably stored in the cluster registry 110 of the quorum device 57 under a registry key for that resource, however it may be maintained elsewhere in the cluster (such as replicated in its systems) if desired. In any event, whenever the application 96 is run, a checkpoint manager 112 accesses the list 108 and registers each subtree in the application's list of registry subtrees with a notification mechanism 114. The notification mechanism 114 watches the registry 104, and, whenever a change to a registered subtree is detected, informs the checkpoint manager 112 of the change. When notified of a change, the checkpoint manager 112, via a snapshot mechanism 116, takes a snapshot of the listed subtree data and records the snapshot as data $118_1$–$118_m$ associated with that application 96 (e.g., snapshot data $118_2$) on the quorum device 57. The data may be stored as text (i.e., human readable) data.

More particularly, to accomplish the checkpointing operation, the checkpoint manager 112 is associated with an interface that includes three cluster resource controls which may be sent to a particular application resource's DLL (e.g., $102_3$, FIG. 3) with a ClusterResourceControl function. A first resource control, CLCTL_ADD_REGISTRY_ CHECKPOINT, includes a pointer named lpInBuffer, which points to a null-terminated Unicode string. The string specifies the name of the registry key at the root of the subtree that should be checkpointed for the specified resource. Since local application subtrees are stored under the HKEY_ LOCAL_MACHINE key $106_3$, the key name string is preferably shortened relative to HKEY_LOCAL_ MACHINE, e.g., the exemplary application is simplified to "SOFTWARE/Program2." Thus, this control function adds a subtree to the subtree list 108 that is associated with an application.

A second resource control, which essentially performs the opposite function, is named CLCTL_DELETE_ REGISTRY_CHECKPOINT, and similarly includes a pointer, lpInBuffer, to a null-terminated Unicode string. This string specifies the name of a registry key that was previously registered with CLCTL_ADD_REGISTRY_ CHECKPOINT. When called, the specified subtree pointed to by lpInBuffer will no longer be checkpointed for the specified resource. Lastly, a control function named CLCTL_GET_REGISTRY_CHECKPOINTS includes a pointer to a buffer named lpOutBuffer, which when invoked, returns a REG_MULTI_SZ list of registry keys that have been added to the specified resource's list 108 with CLCTL_ADD_REGISTRY_CHECKPOINT.

Using this general-purpose checkpointing facility, each resource may have a list of registry subtrees 108 to checkpoint. To receive notifications when the application 96 changes its configuration information, the notification mechanism 114 preferably utilizes a WIN32 API named RegNotifyChangeKey(), via which a registry notification will be posted on each of a resource's subtrees when that resource is online. When any registry data is modified in a subtree with a notification posted thereon, a notification fires and the snapshot mechanism 116 of the checkpoint manager 112 takes a snapshot of the registry subtree (or trees). To accomplish the snapshot, the snapshot mechanism 116 preferably utilizes the WIN32 API named RegSaveKey().

In keeping with the invention, to provide failover support, the snapshot data is saved to the quorum device 57, referenced by the resource ID (a globally unique identifier, or GUID) and a unique checkpoint ID, which is an arbitrary DWORD. The interface for saving the data to the quorum device is set forth in the table below:

```
DWORD
CpSaveData(
    IN PFM_RESOURCE Resource,
    IN DWORD dwCheckpointId,
    IN PVOID lpData,
    IN DWORD lpcbData
)
```

The CpSaveData function checkpoints arbitrary data for the specified resource. The checkpointed data $118_2$ is stored on the quorum device 57 to ensure that it survives temporal partitions, and so that any node in the cluster may save or retrieve the checkpointed data $118_2$. The Resource argument supplies the resource associated with this data, while the dwCheckpointId argument provides a unique checkpoint identifier describing this data. The caller is responsible for ensuring the uniqueness of the checkpoint identifier. Another argument, lpData supplies a pointer to the checkpoint data, while lpcbData provides the length (in bytes) of the checkpoint data pointed to by lpData. The function returns a value of ERROR_SUCCESS if successful, or a Win32 error code otherwise.

In accordance with another aspect of the present invention, once application configuration information is checkpointed (e.g., as the data $118_2$) to the quorum device 57, the application configuration information may be restored to any other node of the cluster 58. Thus, to failover an application to another system $60_2$, the checkpoint manager 120 on the other system $60_2$ includes a restore mechanism 122 that essentially reverses the checkpointing operation. As represented in FIG. 6, when a resource 96 is failed over, but before it is brought online on another system, (as represented by the dashed box), its checkpointed registry data $118_2$ is retrieved and restored into the other system's local registry 124.

To this end, another function, CpGetData(), is provided to retrieve the checkpointed data for a specified resource 96, i.e., the data $118_2$ which was saved to the quorum device 57 by CpSaveData(). The CpGetData() function is set forth in the table below:

```
DWORD
CpGetData(
    IN PFM_RESOURCE Resource,
    IN DWORD dwCheckpointId,
    OUT PVOID *lpData,
    OUT DWORD *lpcbData
)
```

In the present example with the CpGetData function, Resource identifies the resource 96 associated with this data $118_2$, while dwCheckpointId supplies the unique checkpoint ID describing this data. The lpData argument returns a pointer to the checkpoint data, and lpcbData returns the length (in bytes) of the checkpoint data pointed to by lpData. The caller is responsible for freeing the memory, and as before, the caller is responsible for ensuring the uniqueness of the checkpoint identifier. The CpGetData function returns a value of ERROR_SUCCESS if successful, or a Win32 error code otherwise.

To restore the registry, the restore mechanism 122 utilizes the RegRestoreKey() WIN32 API for each checkpointed subtree. Once the other system's registry 124 is restored, the resource can be brought online, i.e., the failed over application 96 can be run. However, because this other system $60_2$ may also fail, the application configuration information is also first tracked and checkpointed on the new system, in accordance with the present invention and as described above, i.e., using a notification mechanism 126.

Turning to an explanation of the operation of the invention with particular respect to the flow diagrams of FIGS. 7–11, the checkpointing operation is initiated when a request is received, either to initially create an initial registry checkpoint (step 700) for an application on the quorum device, or to run the application (step 706). In any event, at this time a cluster application (e.g., 96) and its associated registry subtree 108 are known. If the request is to create a registry checkpoint (e.g., $118_2$), then step 702 obtains the subtree (or subtrees) associated with the application from the list 108 thereof in the cluster registry 110, and continues to step 800 of FIG. 8. Alternatively, if the application 96 is to be run, any initial steps to run the application 96, (e.g., allocate space in memory) may be performed. Then, step 708 determines if a checkpoint $118_2$ already exists for this particular application on the quorum device 57, and if so, continues on to update the application's configuration information and then run the application 96, as described below with reference to FIG. 9. If no checkpoint $118_2$ exists for this resource 96, then step 708 branches to step 702 and then to step 800 of FIG. 8.

Figure 8:
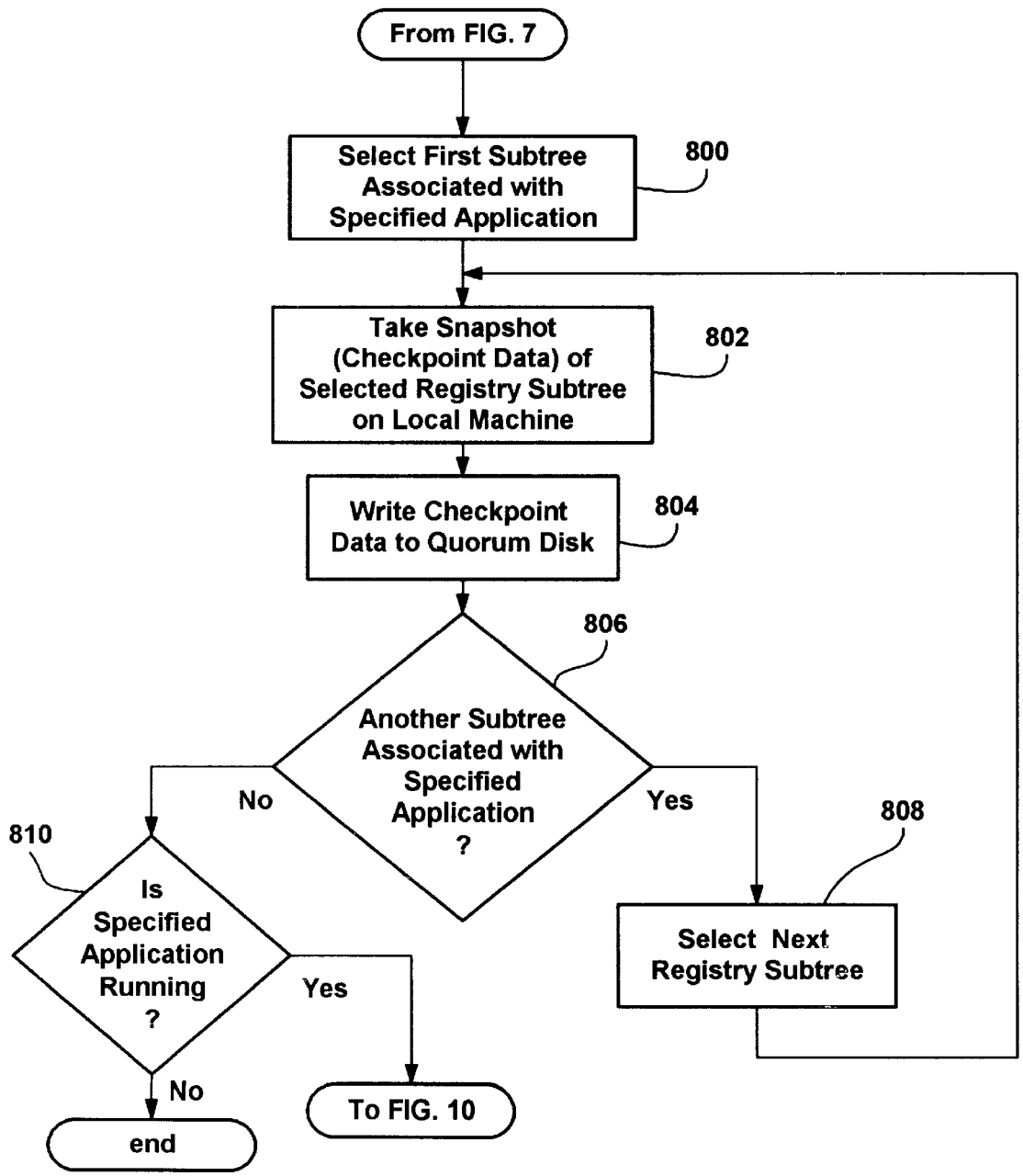

At step 800 of FIG. 8, to create a registry checkpoint $118_2$, a first subtree associated is selected and a snapshot is made of the specified registry subtree (using the RegSaveKey() WIN32 API) as described above. The registry checkpoint data is then saved to the cluster quorum device $118_2$ as also described above (CpSaveData). Note that it is possible to also generate the subtree list 108 associated with the application (using CLCTL_ADD_REGISTRY_CHECKPOINT) at this time, or the list 108 can be generated in advance (step 702). If there is more than one subtree of application configuration information for an application, the process is repeated for each subtree via steps 806–808. This ensures that the appropriate application configuration information will be available to other cluster systems if the current system fails, as the registry subtree and its location on the quorum device 57 are now associated with the cluster application.

When the application has been initially checkpointed, step 810 tests the state of the cluster application 96. If at step 810 the application 96 is not currently running, nothing further needs to be done, and thus the process ends and waits for the application to be run at some later time. Otherwise the system proceeds to step 1000 of FIG. 10, where the process will register for change notifications and take any remaining steps to run the application (step 1001) as described below.

Figure 9:
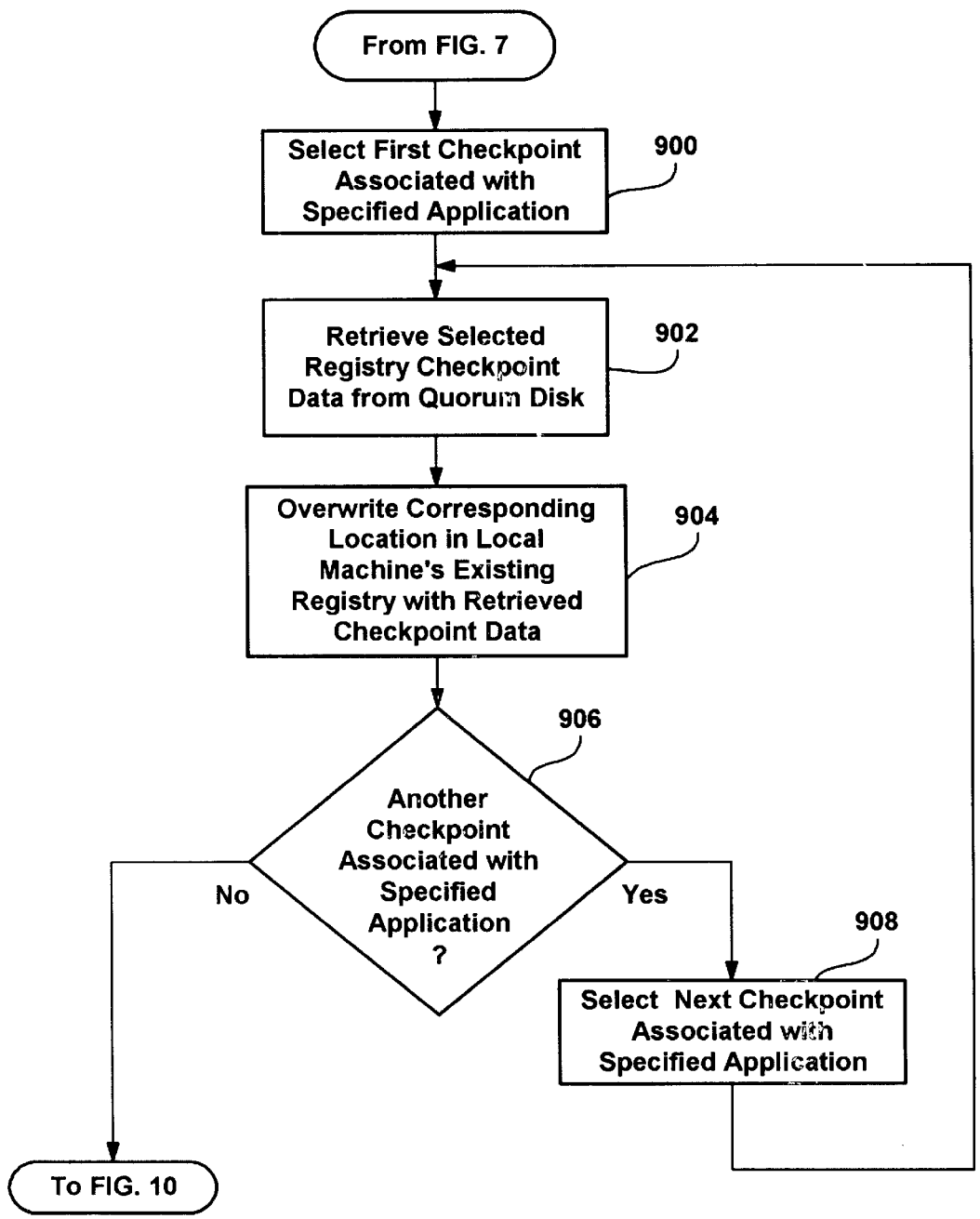

The steps of FIG. 9 are executed when a request is received to run an application (e.g., 96) that has an existing checkpoint 1182 on the quorum device 57. In general, before the application 96 is started, the checkpointing process enumerates all the registry checkpoints associated with the cluster application 96. To this end, for each checkpoint, via steps 900–908, each registry snapshot associated with the application (e.g., $118_2$) is retrieved from its location on the quorum device 57 (using CpGetData), and restored into the current machine's (e.g., $60_2$) local registry 124 using the RegRestoreKey() API. As a result, any previously existing data at that location in the current system's local registry 124 is overwritten with the stored registry snapshot $118_2$, whereby the application 96 will not see any stale data that may have been in the current system's local registry 124.

Next, after each checkpoint has been restored into the local registry 124, the checkpoint manager 120 (via the notification mechanism 126) registers for registry change notifications associated with the registry subtree, using the WIN32 API named RegNotifyChangeKey() as described above. At this time, the application 96 is allowed to run.

Figure 10:
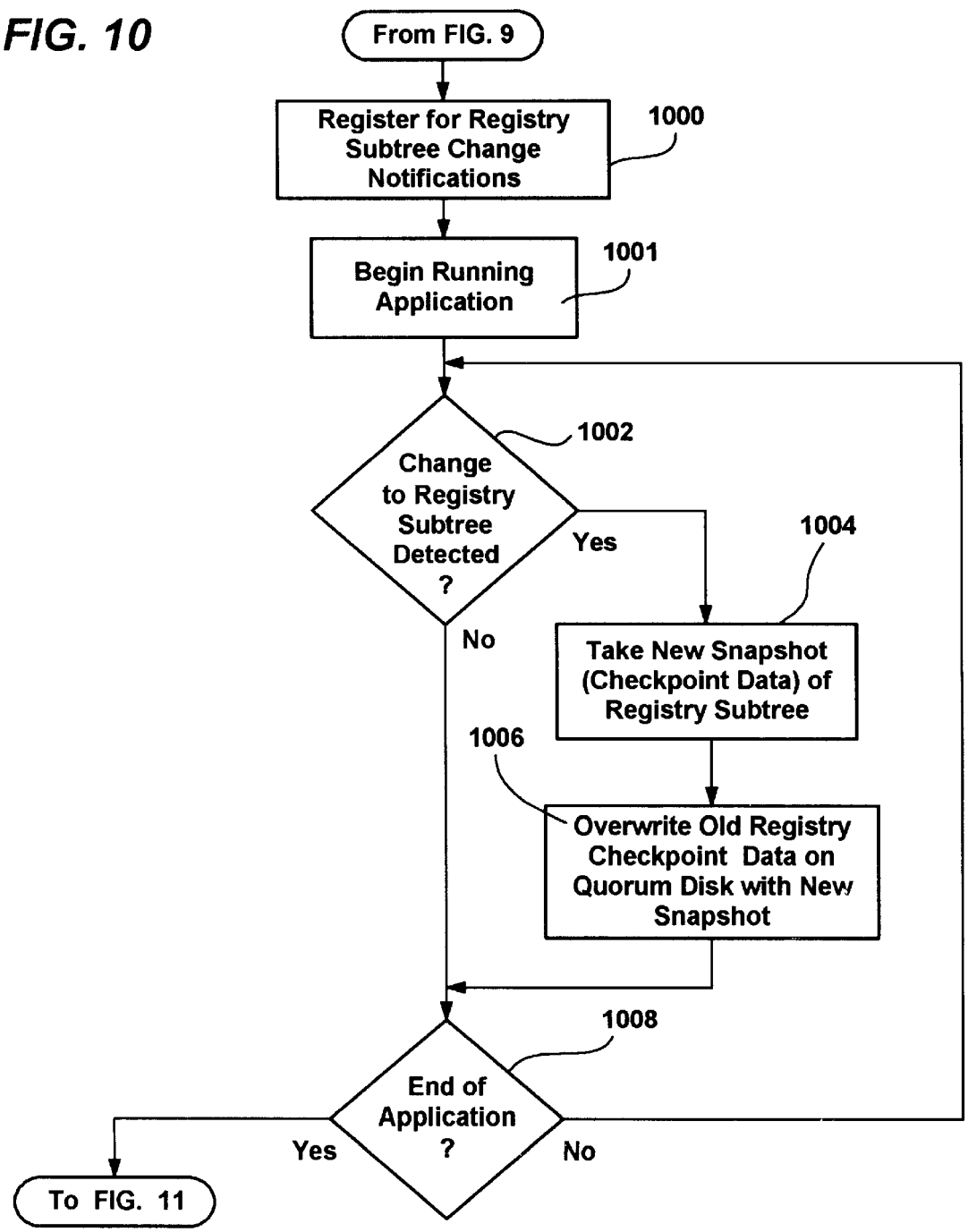

As represented in FIG. 10, any subsequent modifications to the specified registry data alert the notification mechanism 126. The API preferably works asynchronously to report a change to the registry 124, although for purposes of simplicity, FIG. 10 represents the monitoring for changes (or detecting the end of the application) in a loop (steps 1002–1008). In any event, when a change is detected as represented by step 1002, at step 1004, the checkpoint manager 120 takes a snapshot of the registry subtree that has changed as described above. Then, at step 1006, the existing registry checkpoint data $118_2$ on the quorum device 57 is overwritten with the new snapshot of the registry subtree. Note that in a preferred embodiment, the communication mechanism of the current system $60_2$ transfers this information to the system that has exclusive possession of the quorum device 57, which then writes the data. In this manner, each time that the registry data $118_2$ is modified, the appropriate subtree is copied to the quorum device 57, whereby if the application is moved to another node, the configuration information is current on the new node.

FIG. 11 represents the steps taken when an application ends. As shown by steps 1102–1110, any registry change notifications associated with that application are removed so as to no longer fire upon a change. This is synchronized in such a way as to ensure that any registry modifications pending during the application shutdown are detected by the notification mechanism 126 and a new snapshot taken. Then, the shutdown of the application is completed at step 1112.

Lastly, as can be appreciated, instead of using the shared quorum device 57, the checkpoint manager 104 alternatively may write the information to at least one other non-volatile storage device shared by systems in the cluster. In another alternative, the checkpoint manager 104 may cause the information to be replicated via GLUP or some other communications mechanism to the other systems of the cluster. Note that such a replication operation would be logged on the quorum device 57, so that changes to the configuration information would survive a temporal partition. Moreover, rather than snapshot the entire set of subtrees, it is feasible to alternatively provide a mechanism that transfers only change information, for example if the subtree data is otherwise relatively large.

As can be seen from the foregoing detailed description, there is provided a method and system for transparently failing over resource configuration information stored by an application on a local machine. The application configuration information written to a registry of a local machine is made available to other machines of the cluster. The other machines can rapidly obtain this application configuration information and use it to recreate the application's execution environment on another machine in the cluster, ensuring a rapid and transparent failover operation.

While the invention is susceptible to various modifications and alternative constructions, certain illustrated embodiments thereof are shown in the drawings and has been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a server cluster including at least two server systems, a method of failing over a non-cluster-aware application from a first system to a second system of the cluster, comprising, locally maintaining application configuration information for the non-cluster-aware application on the first and second systems, the application configuration information separately maintained and used by an instance of the application executing on each system to determine at least part of an execution environment, running an instance of the non-cluster-aware application on the first system, the non-cluster-aware application instance making a change to the application configuration information, detecting the change to the application configuration information on the first system, and, in response to the change, making data representative of the change available to the second system, and running another instance of the non-cluster-aware application on the second system using the data made available thereto.

2. The method of claim 1 wherein the application configuration information is maintained in a registry of the first system, and wherein detecting a change to the application configuration information includes monitoring for a change to data in at least one subtree associated with the non-cluster-aware application in the registry.

3. The method of claim 2 wherein making data representative of the change available to the second system includes making a copy of the data in each subtree having a change detected thereto.

4. The method of claim 1 wherein making data representative of the change available to the second system comprises writing the data to a storage device shared by systems of the cluster.

5. The method of claim 4 wherein making data representative of the change available to the second system further comprises retrieving the data from the storage device and passing the data to the second system.

6. The method of claim 1 wherein making data representative of the change available to other systems in the cluster comprises storing the data in a quorum device of the cluster.

7. The method of claim 1 wherein making data representative of the change available to other systems in the cluster comprises the step communicating the data to at least one other system in the cluster.

8. The method of claim 1 wherein the first system and the second system each locally maintain application configuration information for the non-cluster-aware application in a registry, and wherein making data representative of the change available to the second system comprises, reading subtree data of the registry in the first system, writing the subtree data to a storage device shared by systems in the cluster, and retrieving the subtree data from the storage device to the registry of the second system.

9. The method of claim 1 wherein the non-cluster-aware application has a list of subtrees associated therewith, and further comprising registering each of the subtrees in the list with a notification mechanism for detecting changes thereto.

10. The method of claim 1 further comprising terminating the instance of the non-cluster-aware application on the first system.

11. The method of claim 1 wherein the cluster includes a third system, and further comprising, locally maintaining application configuration information for another application on the first system, running an instance of the other application on the first system, detecting a change to the other application configuration information, and, in response to the change, making data representative of the change available to the third system, and running another instance of the other application on the third system using the data made available thereto.

12. A computer-readable medium having computer-executable instructions for performing the method of claim 1.

13. In a server cluster including at least two server systems, a system for failing over a non-cluster-aware application from a first system to a second system of the cluster, comprising, a local registry on each of the first and second systems that are not replicas of one another, each local registry configured to store application configuration information of the non-cluster-aware application, the application configuration information used to determine at least part of an execution environment for instances of the application executing on each system, a storage device shared by the first and second systems, a notification mechanism in the first system configured to detect a change made by an instance of the application executing on the first system to a subtree in the registry associated with the non-cluster-aware application and to provide a notification in response thereto, a snapshot mechanism in the first system responsive to the notification and configured to read the registry and save subtree data to the storage device, and a restore mechanism in the second system configured to retrieve the subtree data from the storage device and to update the registry of the second system therewith such that the execution environment for an instance of the application executing on the second system corresponds to the execution environment of the first system.

14. The system of claim 13 wherein the non-cluster-aware application has a list of subtrees associated therewith, and wherein the notification mechanism monitors each of the subtrees in the list for detecting changes thereto.

15. The system of claim 14 wherein the list of subtrees is stored on the storage device.

16. The system of claim 14 wherein the list of subtrees is stored in a cluster registry on the storage device.

17. The system of claim 13 wherein the subtree data includes a name representative of a key in the registry and at least one value.

18. In a server cluster, a method of using application configuration information with an application, comprising:
locally maintaining application configuration information for the application on a system of the cluster, the application configuration information accessed by the application to determine at least part of an execution environment for the application when executed on the system;
determining if a cluster checkpoint of data corresponding to the application configuration information for the application is present on a storage device shared by systems in the cluster; and
if the cluster checkpoint exists,
updating the application configuration information of the local system with the data in the storage device,
running the application with the updated application configuration information, and
updating the cluster checkpoint on the storage device to correspond to local changes made by the application to the application configuration information; and
if the checkpoint does not exist,
creating a cluster checkpoint on the storage device,
running the application with the locally maintained application configuration information, and
updating the cluster checkpoint on the storage device to correspond to local changes made by the application to the application configuration information.

19. A computer-readable medium having computer-executable instructions for performing the method of claim 18.

20. The method of claim 18 wherein the application configuration information is maintained in a local registry of the system, and further comprising detecting a change to the application configuration information by monitoring for a change to data of at least one subtree in the registry.

21. In a server cluster including at least two server systems that each have a local registry that is not a replica of the other, a method of failing over a non-cluster-aware application from a first system to a second system of the cluster, comprising, maintaining application configuration information for the non-cluster-aware application in the local registry of the first system, the application configuration information being used to determine at least part of an execution environment for an instance of the non-cluster-aware application when executed on the first system, running an instance of the non-cluster-aware application on the first system, detecting a change made by the application instance to the application configuration information in a subtree of the local registry, and, in response to the change, writing data of that subtree as subtree data to a storage device shared by systems of the cluster, terminating the instance of the non-cluster-aware application on the first system, reading the subtree data from the storage device, modifying the local registry of the second system with the subtree data read from the storage device, and running another instance of the non-cluster-aware application on the second system using the application configuration information stored in the local registry of the second system, including accessing the application configuration at the other instance such that an execution environment for the instance of the application executing on the second system corresponds to the execution environment of the first system.

22. The method of claim 20 wherein the non-cluster-aware application has a list of subtrees associated therewith, and further comprising registering each of the subtrees in the list with a notification mechanism for detecting changes thereto.

23. The method of claim 21 wherein the cluster includes a third system having a local registry that is not a replica of the local registry of the first system or of the local registry of the second system, and further comprising, maintaining other application configuration information for another application in the local registry of the first system, running an instance of the other application on the first system, detecting a change to the other application configuration information in a subtree of the local registry, and, in response to the change, writing data of that subtree as subtree data to a storage device shared by systems of the cluster, terminating the instance of the other application on the first system, reading the subtree data from the storage device, modifying the local registry of the third system with the subtree data read from the storage device, and running another instance of the other application on the third system using the other application configuration information stored in the local registry of the third system.

24. A computer-readable medium having computer-executable instructions for performing the method of claim 21.

25. In a server cluster having servers including a first system and a second system, a method, comprising, maintaining application configuration information for a non-cluster-aware application on the first system, the application configuration information being used by an instance of the non-cluster-aware application to determine at least part of an execution environment for that instance when executed on the first system, running the non-cluster-aware application on the first system making data representative of the application configuration information available to the second system, and running another instance of the non-cluster-aware application on the second system based on the data made available thereto, the other instance of the application accessing the data such that an execution environment for the instance of the application running on the second system corresponds to the execution environment of the first system.

26. The method of claim 25 further comprising, detecting a change to the application configuration information on the first system.

27. The method of claim 26 wherein making data representative of the application configuration information available to the second system includes making information corresponding to the change available to the second system.

28. The method of claim 25 wherein the application configuration information is locally maintained on the first system.

29. The method of claim 25 wherein the non-cluster-aware application is failed over from the first system to the second system.

30. The method of claim 25 wherein making data representative of the application configuration information available to the second system comprises writing the data to a storage device shared by systems of the cluster.

31. The method of claim 25 wherein making data representative of the application configuration information available to the second system includes updating application configuration information of the second system.

32. A computer-readable medium having computer-executable instructions for performing the method of claim 25.

* * * * *